June 6, 1961 W. H. VATH 2,987,018
MULTI-PURPOSE GARDEN TOOL
Filed Oct. 14, 1957 2 Sheets-Sheet 2

WILLIAM H. VATH
INVENTOR.

BY LeRoy S. Smithers

United States Patent Office 2,987,018
Patented June 6, 1961

2,987,018
MULTI-PURPOSE GARDEN TOOL
William H. Vath, North Merrick, N.Y. (360 Riviera Road, S., Massapequa, N.Y.)
Filed Oct. 14, 1957, Ser. No. 690,122
4 Claims. (Cl. 111—8)

This invention pertains to garden tools and particularly to a hand propelled tool capable of performing widely differing functions in processing and reseeding bare or worn areas in a lawn.

The intermittent character of the work of bare-spotting a lawn emphasizes the need for proper tooling. Soil must be conditioned, fertilized and aerated; seed must be carefully sown and distributed evenly over the bare surface and deposited in such a manner that it will be unaffected by wind or washing away. Each step in the process requires the application of a different tool designed specifically for a particular purpose. Regardless of the size of the worn area to be reconditioned the job calls for the same number of tools. Thus, one tool will be needed for penetrating or spiking the soil to aerate, another will be needed for rolling and still others will be required for mulching, fertilizing and distributing seed. Single purpose accessories call for much unnecessary duplication of parts. Consequently they are expensive to procure and maintain. When the busy gardener has a chance to tackle the bare spotting job the separate tools must be located, assembled and transported to the work by hand and re-stored when the work is finished. So far as is known, no satisfactory way of combining the functions of the several separate units required in a single, multi-purpose device has been achieved.

The present invention provides a solution to the problem of tooling for lawn reconditioning in that separately functioning tool units are combined in a single, hand propelled assembly including a container having means for disseminating seed, fertilizer or granular mulching material of suitable particle size which may be readily transported from one working area to another thereby avoiding a great deal of the annoyance of having to locate, condition and transport a comparatively large number of single purpose tool units.

An important feature of the invention resides in the manner in which the separately functioning tools are combined for ease and speed of handling and mobility to provide in a single package a device sufficiently rugged to withstand the rough handling of normal garden use. At the same time, the combination of functions and the consequent reduction of parts provide substantial economies which enable procurement of the multi-purpose tool of the invention at a price not greatly in excess of a single purpose unit.

Accordingly, it is an object of the invention to provide a multi-purpose garden tool adapted to quick and economical processing of bare or worn spots in turf or lawn.

It is likewise an object of the invention to provide a multi-purpose garden tool adapted to the sowing of seed and one which may be readily transported from place to place and efficiently and conveniently converted from one operation to another by relatively slight displacement angularly with respect to the ground of a handle common to the apparatus required for all purposes.

It is another purpose of the invention to provide a multi-purpose lawn working device incorporating unique means for controlling the amount and particle size of materials spread upon the surface of the ground, and for automatically shutting off the flow of such materials by the release of hand pressure upon a trigger like element associated with the tool handle.

Another feature of the invention inheres in the particular arrangement of known garden working elements comprising the multi-purpose tool of the invention in such a manner that when one carriage supported element of the combination is correctly positioned for ground working, the other elements are out of contact with the ground, thereby rendering the other elements inoperable.

A still further object of the invention is the provision of a bare spotting tool in which each of several operating units is brought into working position with respect to the ground by the tilting of a handle common to all the units included in the combination.

Also an object of the invention is the inclusion of seed sowing and distributing apparatus in which traction of the wheels of a tool supporting carriage agitates the seed in a bin or container, thereby delivering seed outwardly of the container in quantities under control of an operator, and including an indicator for quick setting of apparatus for predetermining the quantity of seed or other materials to be dispersed.

For better understanding of the invention together with other and further objects thereof, reference is had to the following description taken in connection with the accompanying drawings, while the scope will be pointed out in the appended claims.

Figure 1:
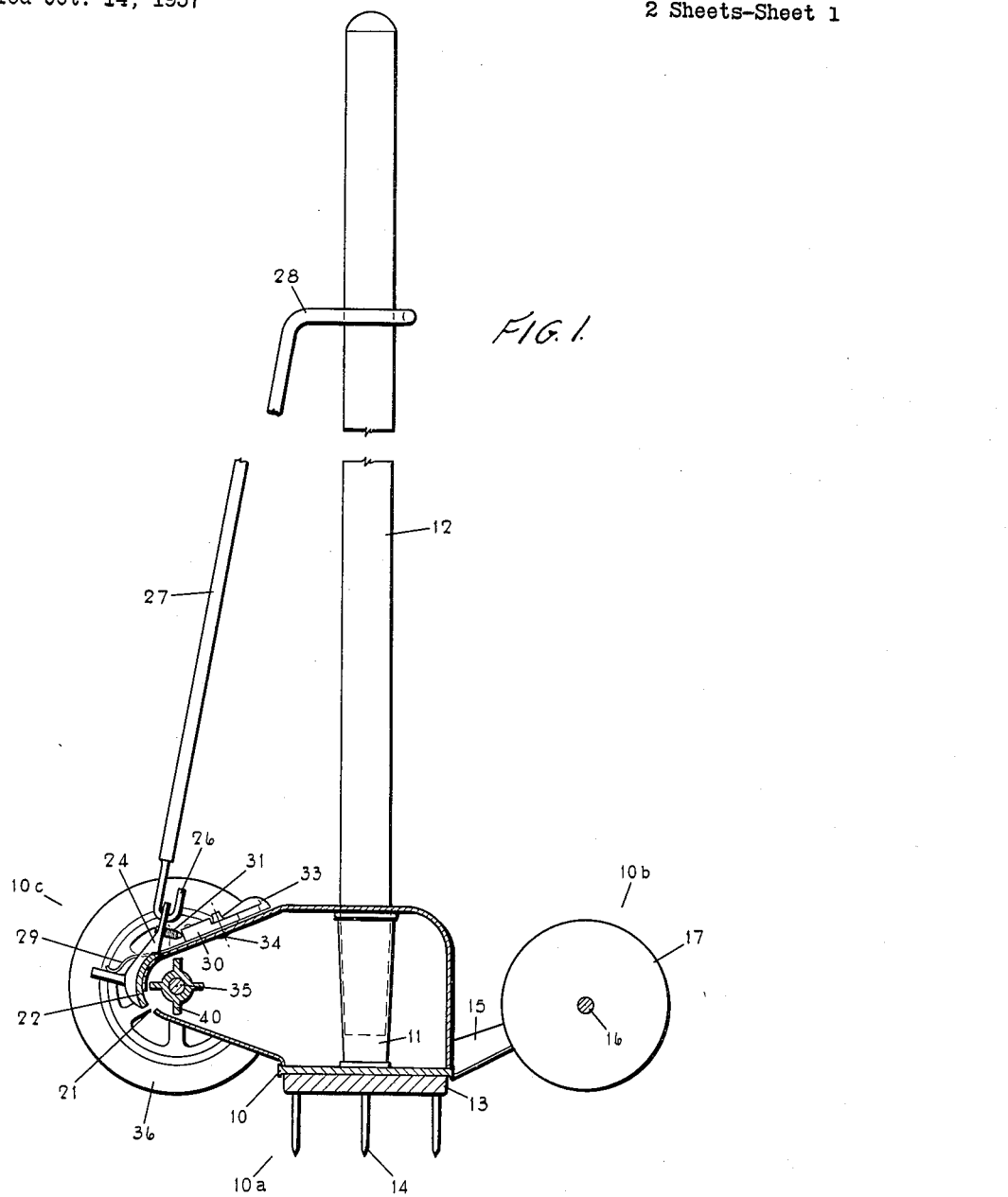
FIG. 1 is a perspective showing the separately functioning units comprising the multi-purpose garden tool of the invention.
Figure 2:
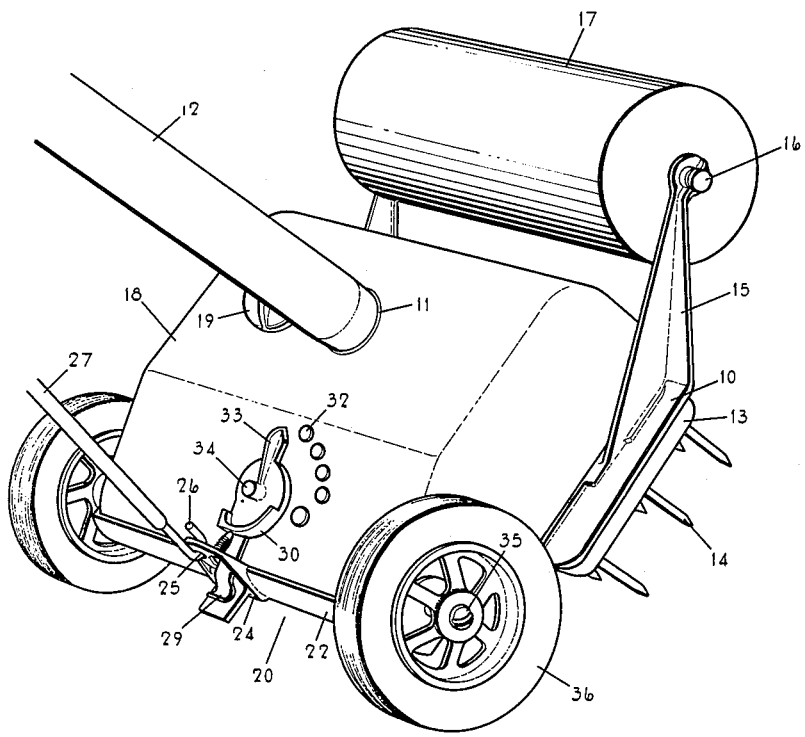
FIG. 2 is a side elevation with portions of the apparatus cut away to depict interior details of the seed bin or container and to illustrate the manner in which materials within the bin are agitated for dispersal upon the ground in controlled particle size and quantity.

As shown in FIG. 1, a garden tool comprehended by the invention may comprise a platform 10, of metal formed, for example by die casting and having suitable reinforcing ridges (not shown) extending transversely of its upper side. Also formed in the upper surface of the platform is a socket 11, centrally disposed for insertion of a handle 12, which may be firmly fixed in position by a screw insertable through conveniently located receptors in the platform, or by any suitable fastening means. It should be noted that the handle extends normally of the platform and parallel to soil aerators 14. When the handle is vertical with respect to the ground, as shown in FIG. 2, the tool is correctly positioned for soil tamping or spiking.

As will be described presently, the platform serves as the body portion of a carriage and will hereafter be designated either as platform or carriage depending upon the particular function referred to. Fixed to the under side of the platform is a flat, perforated plate or holder 13, having tapering spikes 14, protruding outwardly and vertically downward thereof for penetrating or otherwise working the soil as by tamping. Such apparatus is generally known in the art as an aerator. It will be understood that the spikes are merely illustrative of one form of aerator and that other means such as disc or star-wheel harrows could be substituted or made interchangeable therewith without departing from the purposes of the invention.

Formed integrally of the platform and extended at an angle therefrom are spaced, axle supporting members 15, having ends journalled to receive axle shaft 16, supporting a turf or ground roller 17, which may be brought into contact with the ground by tilting the handle and the platform fixed thereto. When the roller is in ground working position, the angle of tilt will be opposite to that shown in Fig. 1. It will be noted that when the tool is in roller traction position, the aerator portion of the tool will be lifted clear and the roller will be completely free for ground movement.

Fixed to the carriage platform 10, in any suitable manner, is seed bin or container 18, preferably formed of sheet metal and having a filling aperture in its upper surface conveniently adapted to closure by the insertion of cap or plug 19. The container may be readily removed for cleaning or other purposes by loosening screws or fasteners accessible from underside of the platform.

The bin or receptacle tapers at the end 20, and terminates in a series of apertures 21, better shown in FIG. 2, which extend across the apex of the tapering portion. A shutter like plate member 22, curved to adapt itself closely to the tapered, outside end of the container is disposed for arcuate, sliding motion across the apertures and therefor by pivotable retainer lugs (not shown), extending through opposite walls of the container.

At mid point of shutter plate member 22, is lug 24, having a perforation 25, adapted to insertion of a hook 26, formed at one end of a draw rod or triggering member 27. The opposite end of the rod is coiled to fit over the handle 12, to maintain the rod substantially parallel or at a slight angle with respect to the handle. The rod is contoured at 28, to provide a grip for the finger. When pressure is applied, the trigger 28, slides the shutter plate to expose the apertures 21, of the container. A flat spring clip 29, is tensioned by the shutter triggering action against an extension of lug 24, and tends to return the shutter to normally closed position the instant pressure upon the trigger is released.

When materials other than seed, for example, feed, fertilizer or mulch are to be applied to a surface, it will be appreciated that particle size or quantity of the material to be distributed may call for variation in the effective diameter of the apertures. To this end, means limiting the effective movement of the shutter plate, independently of excess pressure which may be applied upon the trigger, is exemplified by camming member 30, which may be interposed under a projection or stop 31, on shutter lug 24, the slope of the cam thereby predetermining the arcuate movement of the shutter plate and the effectiveness of the pull of the triggering draw rod. Projections 32, on the surface of the container provide frictional contact for a handle pointer arm 33, formed integrally of the cam to serve as an indicator for any desired angularity of adjustment of the cam upon its pivot 34, to predetermine the size of the uncovered aperture.

As will be observed in greater detail in Fig. 2, an axle 35, having rubber tired wheels 36, rotatably mounted at either end, projects through the side walls of the container to provide for ground propulsion or traction of the carriage 10, and the separately functioning tool units, 10a, 10b and 10c, supported thereby.

Formed integrally of, or otherwise rigidly fixed to the axle 35, and extending interiorly of the container is an impeller blade 40, projecting spirally and outwardly of the axle shaft. The blades thus constitute an agitator to mix and churn the contents of the container so as to prevent the formation of lumps which otherwise might clog the dispensing apertures. Agitation occurs whenever the wheels are turned. The impeller blades move in close proximity across the inner surface of the container bin and the churning action of the impeller forces seed or other material through the apertures for even disposal upon the ground over which the wheels are travelling.

When the carriage wheels are in tractable position it will be seen that angular tilt of the carriage and the handle is opposite from that applied for soil rolling. Similarly with respect to the angle of tilt required for aerating. When the carriage wheels are in correct ground contact, neither roller nor spikes are operable with respect to the ground. The operable position of each of the separate units comprising the tool is thus established by the tilt applied to the handle.

Apparatus of the type described ordinarily is not intended for extensive gardening operations though it will be understood that the invention is not limited or prescribed by dimensions of the separate units. The primary function is that of bare spot conditioning requiring that the various units be of proportions suitable for ready transport from point of filling to any location in a garden, by hand.

Operation of the multi-purpose tool of the invention will now be clear. Mulch, feed, fertilizer or seed may be inserted in the bin 18, in tool shed or other conveniently sheltered storage space. When filled, the cover or plug 19, is tightly applied. The tool is wheeled to the work station without lifting. The tool handle is then tilted to vertical and the spiked projectors 14, may be applied to the ground surface by tamping action interspersed with wrist movement to vary the size of the penetrations or to work the soil in any desired manner.

When the soil is completely aerated or penetrated and ready for further processing as by seeding or for the application of other materials, the tool handle again is tilted, the wheels 36, are brought into contact with the ground, and a push or pull of the handle will cause rotation of the impeller blades 40, to churn the contents of the container. At a suitable moment, pressure of a finger is applied to the trigger 28, to move draw rod 27, to open shutter 22. Depending upon the rapidity of wheel motion, the impeller will disseminate seed outwardly through apertures 21, as long as the wheels are continued in motion and as long as pressure upon the trigger is maintained. Release of the trigger, of course, instantly permits the covering shutter to close under the urge of its retaining spring 29, and no further dispensing will take place even though the wheels and the impeller continue to turn.

After seeding, the tool position is reversed and the handle again tilted to bring the roller 17, into satisfactorily operative position, thereby clearing the wheels 36, and simultaneously tilting the aerators 14, so as to assure ground clearance. Back and forth movement will cause the roller to turn, and forceful pressure on the handle will press the disseminated seed firmly into the ground surface and into the penetrations previously made.

The versatility of the multi-purpose tool herein described, in connection with soil aerating component 10a, turf roller 10b and seed spreading unit 10c, will be recognized. Though intended primarily for these three major operations of bare spotting, it will be understood that the components listed may be subject to change in position or made interchangeable with other units intended for lawn conditioning purposes without departing from the spirit of the invention. Thus the seed spreading container 18, could be made interchangeable with a fluid feeder; the roller 17, with a raker; and the aerator 14, with conditioners of other types previously referred to.

Having described the apparatus of the invention and its manner of application, what is desired to be protected is enumerated in the appended claims.

What is claimed is:

1. A combination garden tool comprising three separately functioning units on a platform supported in one position by wheels; soil spiking elements on the under side of said platform; a handle and a socket extending vertically from said patform; a seed dispensing container and a turf roller mounted upon the upper side of said platform and on opposite sides of said handle; an impeller driven by said wheels and in communication with normally closed apertures extending substantially the full width of said container; a trigger on said handle for shuttering said apertures; an indicator on said container for predetermining the effective shutter opening movement to be applied by said trigger; the tilt of said handle from the vertical in one direction being required to bring said wheels into ground engaging position and the apertures of said container into seed dispensing position; the tilt of said handle from the vertical and in the opposite direction being required to bring said roller into ground working position and the tilt of said handle to vertical position being required to dispose said spiking elements for effective soil aeration.

2. Apparatus as in claim 1 and including the improvement wherein 90° is the maximum included angle between the extreme tilt positions of the said handle required to bring any one of said units into ground working position.

3. Apparatus as in claim 1 and including the improvement wherein 45° is the maximum angle of tilt from the vertical required to bring any one of the said units into ground working position.

4. A hand propulsion, soil conditioning tool comprising separately functioning units including a seed distributor and a turf roller and means for mounting them upon the upper side of a wheel platform; soil aerating elements extending vertically downward from the opposite side of said platform; a handle in a socket extending vertically upward from said platform; said mounting means so positioning said units relatively to one another and said handle that the tilt of said handle will bring any one of said units into operative position with respect to the ground.

References Cited in the file of this patent

UNITED STATES PATENTS

| | | |
|---|---|---|
| 395,784 | Huggins | Jan. 8, 1889 |
| 665,871 | Brooks | Jan. 15, 1901 |
| 1,517,791 | McAndrew | Dec. 2, 1924 |
| 1,806,936 | Finnell | May 26, 1931 |
| 1,888,821 | Fearn | Nov. 22, 1932 |
| 1,914,915 | Handler | June 20, 1933 |
| 1,940,606 | Ryan | Dec. 19, 1933 |
| 2,020,571 | Pick | Nov. 12, 1935 |
| 2,069,958 | Diemer Kool | Feb. 9, 1937 |
| 2,520,413 | Kent | Aug. 29, 1950 |
| 2,678,145 | Juzwiak et al. | May 11, 1954 |
| 2,718,986 | Peoples | Sept. 27, 1955 |
| 2,779,507 | Rader | Jan. 29, 1957 |
| 2,801,772 | Schiebel | Aug. 6, 1957 |